(12) United States Patent
Geldenhuys et al.

(10) Patent No.: US 7,249,932 B2
(45) Date of Patent: Jul. 31, 2007

(54) SHIELDING A BEARING AND SEAL ASSEMBLY FROM UNDESIRABLE MATTER

(75) Inventors: Siegfried Geldenhuys, Erasmuskloof (ZA); Robert Denis Todd, Eastern Cape (ZA)

(73) Assignee: Weir Minerals Africa (Proprietary) Limited, Isando (ZA)

( * ) Notice: Subject to any disclaimer, the term of this patent is extended or adjusted under 35 U.S.C. 154(b) by 52 days.

(21) Appl. No.: 10/524,973

(22) PCT Filed: Jul. 15, 2003

(86) PCT No.: PCT/IB03/02796

§ 371 (c)(1),
(2), (4) Date: Jun. 24, 2005

(87) PCT Pub. No.: WO2004/018881

PCT Pub. Date: Mar. 4, 2004

(65) Prior Publication Data

US 2005/0269786 A1   Dec. 8, 2005

(30) Foreign Application Priority Data

Aug. 21, 2002 (ZA) .............. 2002/6705
Mar. 17, 2003 (ZA) .............. 2003-2137

(51) Int. Cl.
*F03B 11/06* (2006.01)
*F03B 11/08* (2006.01)
(52) U.S. Cl. .............................. 415/230; 415/231
(58) Field of Classification Search ........ 415/230, 415/231, 229; 384/130, 139, 140, 147, 148; 277/423, 425, 549, 551, 572
See application file for complete search history.

(56) References Cited

U.S. PATENT DOCUMENTS

| 4,428,587 A | 1/1984 | Forch |
| 6,485,256 B1 * | 11/2002 | Iketani ............... 277/423 |

FOREIGN PATENT DOCUMENTS

| DE | 2322458 | 11/1974 |
| DE | 19543764 | 5/1997 |
| EP | 1 050 700 | 11/2000 |
| GB | 507842 | 6/1937 |
| GB | 2369413 | 5/2002 |
| JP | 7 332 377 | 12/1995 |

OTHER PUBLICATIONS

English Abstract of EP 1 050 700 dated Nov. 8, 2000.
English Abstract of JP 7 332 377 dated Dec. 22, 1995.

* cited by examiner

*Primary Examiner*—Edward K. Look
*Assistant Examiner*—Dwayne J White
(74) *Attorney, Agent, or Firm*—Ladas and Parry LLP

(57) ABSTRACT

A rotary pump includes an impeller mounted on a shaft (12) supported for rotation in bearings. A bearing and bearing casing assembly (26) proximate the impeller is prone to ingress of undesirable matter. A shield assembly (40) includes the shaft (12) and a shield (40) rotatable with the shaft and positioned intermediate the impeller and the bearing assembly (26). The shield comprises an integral, moulded, disc (42) and composite rim (44), which includes a lip (50) having an inwardly proud beading (52) normally touching an outer periphery (34.1) of the bearing assembly. A cowl (48) surrounds the lip with clearance when the shaft (12) rotates. The beading (52) dilates under centrifugal force to provide running clearance.

10 Claims, 1 Drawing Sheet

SHIELDING A BEARING AND SEAL ASSEMBLY FROM UNDESIRABLE MATTER

Figure 1:
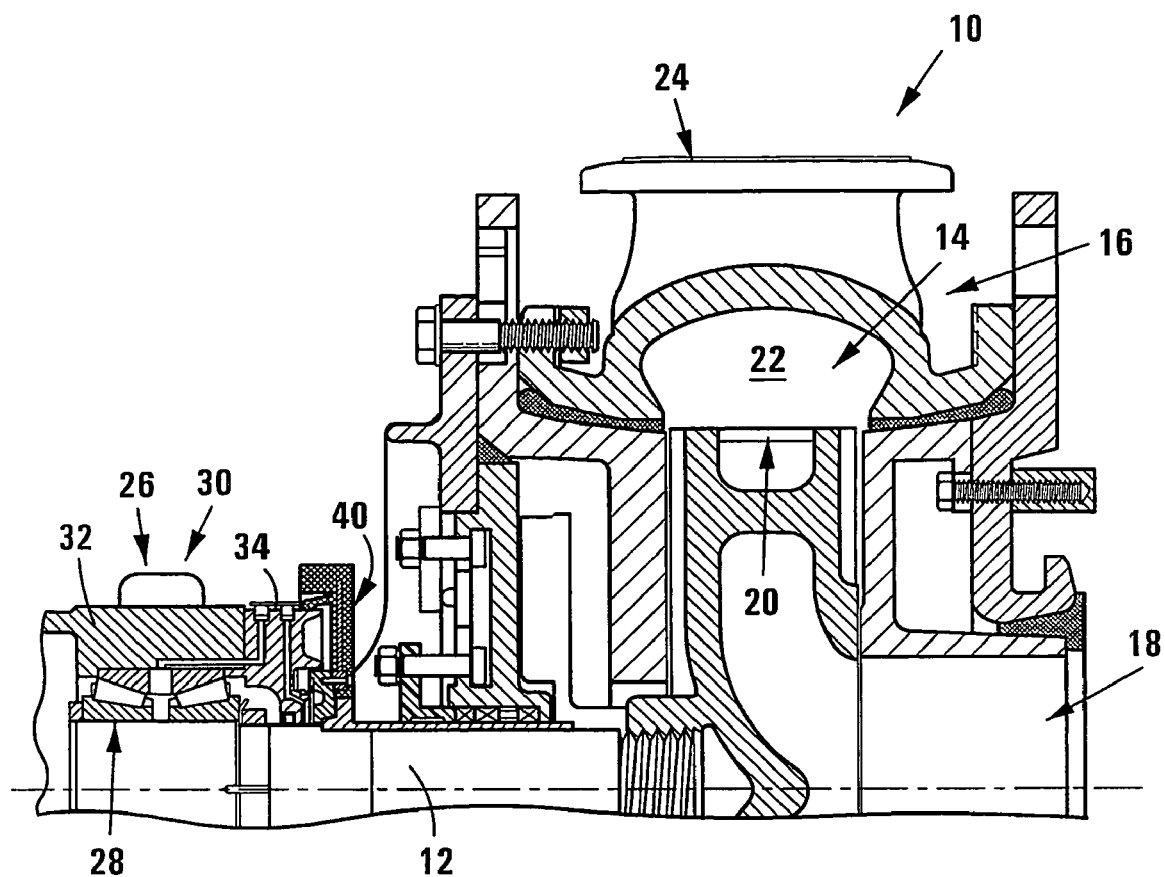

THIS INVENTION relates to shielding a bearing from undesirable matter. It relates more specifically to a method of and a rotary shield assembly for shielding a bearing of a rotary pump from undesirable matter.

This invention is expected to find particular application in a pump operating under arduous conditions, such as a rotary slurry pump, especially a centrifugal slurry pump. This application will particularly be borne in mind for purposes of this specification.

In a centrifugal slurry pump, a centrifugal impeller is supported for rotation in a pump casing in cantilever arrangement. A shaft carrying the impeller at a free end thereof is rotatably supported in bearings, one of which is positioned within a bearing casing proximate the impeller. Various sealing mechanisms are used to seal an end of the bearing proximate the impeller against ingress of stray slurry and other undesirable matter. Of the sealing mechanisms are dynamic, i.e. relying on rotation to operate. When the pump is stationary, such dynamic sealing mechanisms are inoperative.

In accordance with a first aspect of the invention, there is provided a method of shielding a bearing, which is mounted in a bearing casing and which supports a shaft for rotation, against undesirable matter, the method including laterally covering a side of the bearing and the bearing casing by means of a circumferential shield rotatably fast with the shaft and having a peripheral rim at least partially overlapping the bearing casing;

when the shaft is rotating, dilating said peripheral rim to provide running clearance, and flinging any loose matter touching the shield centrifugally away from the bearing casing;

when the shaft is stationary, contracting said peripheral rim to touch the bearing casing to provide a seal.

The rim may be resilient and may be arranged to be resiliently biased to touch the bearing casing. During rotation, centrifugal force dominates the resilient bias.

The method may include shielding the peripheral rim by means of a cowl overlapping the peripheral rim. Said overlapping of the peripheral rim may be with annular clearance.

Touching the bearing casing when the shaft is stationary may be by means of a peripheral beading inwardly proud of the peripheral rim.

In accordance with a second aspect of the invention, there is provided a rotary shield assembly comprising a shaft supported for rotation in a bearing mounted in a stationary bearing casing, and a shield comprising a rotary disc around the shaft proximate a side of the bearing;

a peripheral rim along an outer periphery of the disc and at least partially overlapping the bearing casing;

a bias mechanism biassing the rim toward the bearing casing, the arrangement being adapted, during rotation, on account of mass of the rim, to cause centrifugal force to dilate the rim away from the casing to provide running clearance.

One of or both of the rim and the disc may be of a resilient material, the resilience of the material providing said biassing mechanism. Instead, resilient biassing means may be provided to contract the rim.

Advantageously, the disc and the rim may be integral. The disc and the rim may be in the form of a moulding. The moulding material may be resilient to provide the biassing mechanism.

The disc may be reinforced or stiffened. The disc may include an internally embedded stiffening disc moulded within the synthetic polymeric disc.

In a developed embodiment, the rim may be a composite rim comprising an outer peripheral cowl and an inner peripheral lip which is resiliently biassed to touch the bearing casing when stationary. The cowl may circumferentially overlap the lip with annular clearance.

The disc may advantageously be drivingly secured to the shaft, for example by means of a flange mounted on the shaft.

In accordance with a third aspect, the invention extends to a rotary pump having a rotary shield assembly in accordance with the second aspect, in which the shaft of the rotary shield assembly is provided by a shaft of the rotary pump, and in which the shield of the rotary shield assembly is mounted intermediate an impeller of the pump and a bearing casing in which the shaft is supported for rotation.

Mounting of the shield on the shaft may then be via a circumferential flange mounted on the shaft, the shield being secured to the flange.

Figure 2:
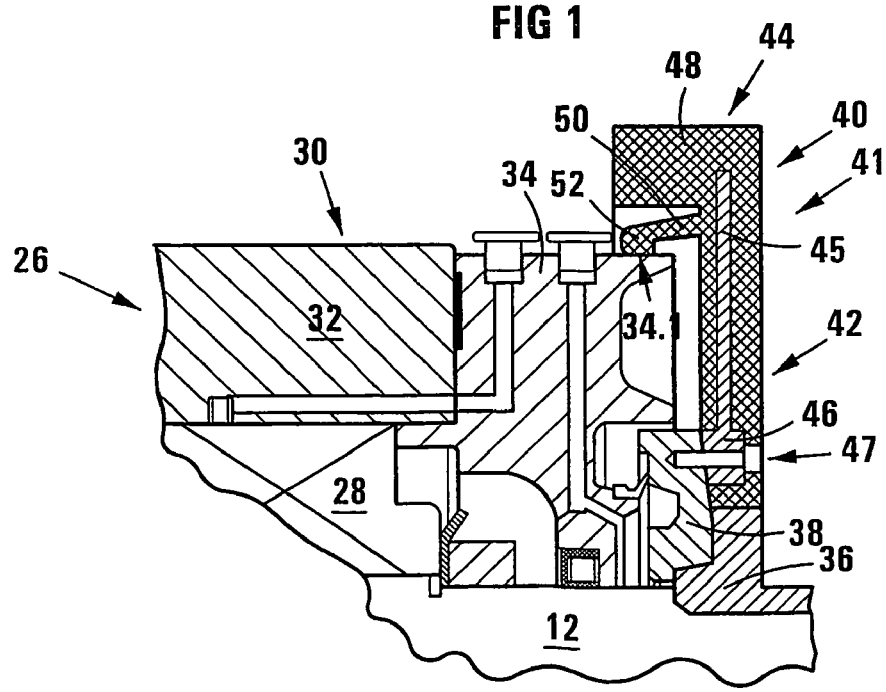

The invention is now described by way of example with reference to the accompanying diagrammatic drawings. In the drawings FIG. 1 shows, fragmentarily, in axial section, a rotary pump in accordance with the invention;

FIG. 2 shows, to a larger scale, fragmentarily, in axial section, a rotary shield assembly in accordance with the invention, and forming part of the rotary pump of FIG. 1.

With reference to FIG. 1 of the drawings, a rotary pump in accordance with the invention is generally indicated by reference numeral 10. The pump 10 comprises a shaft 12 carrying a centrifugal impeller 14 within a stationary pump casing 16. In use, matter to be pumped, for example slurry, enters via an axial inlet 18 in the pump casing 16 and leading to a corresponding inlet of the centrifugal impeller and is centrifugally pumped via an outlet 20 of the impeller 14 into a volute 22 in the pump casing 16 and then via an outlet 24 which, in use, will be connected to ducting.

With reference also to FIG. 2, the shaft 12 is supported for rotation in bearings. Only a bearing proximate the pump casing 16 is shown in the drawings. That bearing is incorporated in a bearing and bearing casing assembly generally indicated by reference numeral 26 and comprising the bearing 28 in the form of a roller bearing and a composite casing 30 comprising a barrel 32 within which an outer race of the bearing 28 is mounted, and a side cover 34. In this embodiment, the side cover 34 is shown to include grease conduits and also mounts a seal, for example in the form of a stuffing box and gland seal.

Seal arrangements generally in accordance with this invention are suitable also for oil lubrication applications.

Intermediate the side cover 34 and the pump casing 16, proximate the side cover 34, there is provided a collar 36 secured to the shaft 12, and intermediate the collar 36 and the side cover 34, a flange 38 secured to the collar 36.

In accordance with the invention, there is provided a shield assembly generally indicated by reference numeral 40 and comprising the shaft 12, the bearing and casing assembly 26 and a shield 41 secured to the flange 38 in close association with the side cover 34. The shield 41 comprises a disc 42 and a composite rim portion 44. The shield 41 is in the form, mainly, of a moulding of a synthetic polymeric material, natural rubber, or the like. If desired, the disc 42 is internally strengthened or stiffened by means of an internal stiffener 45, for example of disc shape, which is moulded into the disc 42. A radially inward portion of the stiffener 45 is in the form of a peripheral hub 46 having apertures via which the shield 41 is secured by means of cap screws to the flange 38 as generally indicated by reference numeral 47.

The composite rim portion 44 comprises an outer cowl 48 which overlaps, partially, the side cover 34. Concentrically within the cowl 48, and generally parallel therewith, there is provided a peripheral lip 50 having, toward a free end thereof, a beading 52. The lip 50 is advantageously shallow frusto-conical being of smaller diameter toward its free end than toward its base. The beading 52 is dimensioned and arranged to touch a peripheral sealing face 34.1 of the side cover 34.

It is to be appreciated that the material of the lip 50 is resilient. Thus, when the shaft 12 is rotated and the shield 41 rotates therewith, centrifugal force on account of rotation and the mass of the lip 50 causes the lip 50 to dilate, mostly toward the free end thereof and thus mostly in respect of the beading 52, thus to lift off the sealing face 34.1 and thus to provide running clearance.

With reference again to FIG. 1, when stray slurry and other undesirable matter is present in the vicinity of the side cover 34, the side cover 34 is shielded from such matter by the shield 41. Furthermore, when such matter touches the shield 41 during rotation, the matter is centrifugally flung outwardly and away from the internal seals of the side cover 34.

It is further to be appreciated that the cowl 48 shields the side cover 34, and more specifically areas immediately outwardly adjacent the side cover 34, from undesirable matter.

When the shaft 12 is stationary, the beading 52 seals against the sealing face 34.1 of the side cover and thus prevents undesirable matter from ingressing into the area immediately adjacent the side cover 34.

The Applicant believes that the invention provides an elegant, simple and inexpensive method and device for shielding a bearing casing from the effects of undesirable matter, such as stray slurry in a slurry pump application.

The Applicant regards two aspects as of particular importance. First, the rotary shield assembly is operative when the rotor is stationary in that the lip touches and seals the periphery of the stationary side cover of the bearing casing, yet the rotary shield assembly allows running clearance during rotation of the rotor. Secondly, the diameter of the shield is such as to shield effectively the whole of the side cover (at least those portions vulnerable to ingress of undesirable matter). The Applicant is of opinion that it is important that the shield overlaps, or hoods or cowls the side cover.

The invention claimed is:

1. A method of shielding a bearing against undesirable matter, which bearing is mounted in a bearing casing including a side cover covering a side of the bearing casing and mounting a bearing seal, and which bearing supports a shaft for rotation, the method including laterally covering a side of the bearing and the bearing casing such as laterally to overlap or hood or cowl said side cover by means of a circumferential shield rotatably firmly attached to the shaft and having a peripheral rim at least partially overlapping the bearing casing;

when the shaft is rotating, dilating said peripheral rim to provide running clearance, shielding the bearing casing from stray undesirable matter and flinging any such stray undesirable matter touching the shield centrifugally away from the bearing casing;

when the shaft is stationary, contracting said peripheral rim to touch the bearing casing to provide a seal.

2. A method as claimed in claim 1, which includes shielding the peripheral rim by means of a cowl overlapping the peripheral rim, with annular clearance.

3. A rotary shield assembly comprising a shaft supported for rotation in a bearing mounted in a stationary bearing casing including a side cover covering a side of the bearing casing and mounting a bearing seal, and a shield comprising a rotary disc around the shaft proximate to and shielding a side of the bearing such as laterally to overlap or hood or cowl said side cover;

a peripheral rim along an outer periphery of the disc and at least partially overlapping the bearing casing;

a bias mechanism biasing the rim toward the bearing casing, the arrangement being adapted, during rotation, on account of mass of the rim, to cause centrifugal force to dilate the rim away from the casing to provide running clearance.

4. A rotary shield assembly as claimed in claim 3, in which one of or both of the rim and the disc are in the form of a moulding or mouldings of a resilient moulding material, the resilience of the moulding material providing said biasing mechanism.

5. A rotary shield assembly as claimed in claim 4, in which the disc is reinforced or stiffened.

6. A rotary shield assembly as claimed in claim 5 in which the disc includes an internally embedded stiffening disc moulded within the synthetic polymeric disc.

7. A rotary shield assembly as claimed in claim 3, in which the rim is a composite rim comprising an outer peripheral cowl and an inner peripheral lip which is resiliently biased to touch the bearing casing when stationary, and in which the cowl circumferentially overlaps the lip with annular clearance.

8. A rotary shield assembly as claimed in claim 3, in which the disc is drivingly secured to the shaft.

9. A rotary pump having a rotary shield assembly as claimed in claim 3, in which the shaft of the rotary shield assembly is provided by a shaft of the rotary pump, and in which the shield of the rotary shield assembly is mounted intermediate an impeller of the pump and a bearing casing in which the shaft is supported for rotation.

10. A rotary pump as claimed in claim 9 in which mounting of the shield on the shaft is via a circumferential flange mounted on the shaft, the shield being secured to the flange.

* * * * *